US011451993B2

(12) United States Patent
Steigert et al.

(10) Patent No.: US 11,451,993 B2
(45) Date of Patent: Sep. 20, 2022

(54) SYSTEMS AND METHODS FOR REMOTE RADIO FREQUENCY DEVICE MONITORING

(71) Applicant: CommScope Technologies LLC, Hickory, NC (US)

(72) Inventors: Johannes Steigert, Harburg (DE); Milian Reile, Monheim (DE)

(73) Assignee: CommScope Technologies LLC, Hickory, NC (US)

( * ) Notice: Subject to any disclaimer, the term of this patent is extended or adjusted under 35 U.S.C. 154(b) by 134 days.

(21) Appl. No.: 16/885,093

(22) Filed: May 27, 2020

(65) Prior Publication Data

US 2021/0029567 A1  Jan. 28, 2021

Related U.S. Application Data

(60) Provisional application No. 62/878,473, filed on Jul. 25, 2019.

(51) Int. Cl.
*H04W 24/10* (2009.01)
*H04W 4/38* (2018.01)
(Continued)

(52) U.S. Cl.
CPC ............. *H04W 24/10* (2013.01); *H04W 4/38* (2018.02); *H04W 4/80* (2018.02); *H04W 88/085* (2013.01)

(58) Field of Classification Search
CPC ...... H04B 17/104; H04B 17/16; H04B 17/17; H04B 17/18; H04B 17/19; H04B 17/318;
(Continued)

(56) References Cited

U.S. PATENT DOCUMENTS 10,339,346 B2 * 7/2019 Nikitin ................. H01Q 3/20
2012/0105208 A1 * 5/2012 George ............ G06K 7/10178
340/10.1
(Continued)

FOREIGN PATENT DOCUMENTS

| CN | 103338469 B | 4/2018 |
| WO | 2017009477 A1 | 1/2017 |
| WO | 2017009479 A1 | 1/2017 |

OTHER PUBLICATIONS

"Demonstration of Improved Passive UHF RFID Coverage using Optically-Fed Distributed Multi-Antenna System"; Sabesan et al.; 2009 IEEE International Conference on RFID (Year: 2009).*
(Continued)

*Primary Examiner* — Benjamin H Elliott, IV
(74) *Attorney, Agent, or Firm* — Fogg & Powers LLC

(57) ABSTRACT

Systems and methods for remote radio frequency device monitoring are provided. In one embodiment, an RF communication system comprises: an RF transceiver system; an RF device coupled to the RF transceiver system by a cable, wherein the RF transceiver system is configured transmit an RF signal to the RF device via the cable; a remote measurement transceiver in communication with a processor of the RF transceiver system; a remote measurement transponder coupled between the cable and the RF device; wherein the processor controls the remote measurement transceiver to transmit an interrogation signal to the remote measurement transponder; wherein the remote measurement transponder determines a first parameter of the at least one RF device based on the RF signal as detected at the RF device, and transmits a response signal to the remote measurement transceiver comprising measurement data; wherein the remote measurement transceiver outputs the measurement data to the processor.

20 Claims, 10 Drawing Sheets

(51) Int. Cl.
*H04W 4/80* (2018.01)
*H04W 88/08* (2009.01)

(58) Field of Classification Search
CPC ....... H04B 17/103; H04B 1/40; H04W 24/10; H04W 4/38; H04W 4/80; H04W 88/085
See application file for complete search history.

(56) References Cited

U.S. PATENT DOCUMENTS

| | | | | |
|---|---|---|---|---|
| 2017/0017816 | A1* | 1/2017 | Stefanik | H04W 24/06 |
| 2017/0318561 | A1* | 11/2017 | Harel | H04W 88/085 |
| 2018/0129841 | A1* | 5/2018 | Stefanik | G06K 7/10356 |
| 2018/0212692 | A1* | 7/2018 | Kummetz | H04W 24/06 |
| 2018/0302163 | A1* | 10/2018 | Ziv | H01Q 21/065 |
| 2019/0239230 | A1* | 8/2019 | Harel | H04W 72/0493 |
| 2020/0144973 | A1* | 5/2020 | Gunzner | H03F 1/52 |
| 2021/0029567 | A1* | 1/2021 | Steigert | H04W 4/80 |

OTHER PUBLICATIONS

"Enhanced RFID Tag Detection Accuracy Using Distributed Antenna Arrays"; Ndifon et al.; 2018 IEEE International Conference on RFID (RFID) (Year: 2018).*

"Performance Improvements of Multicast RFID Systems using Phased Array Antennas and Phase Diversity"; Ndifon et al.; 2017 IEEE International Conference on RFID Technology & Application (RFID-TA) (Year: 2017).*

"Wide Area Passive UHF RFID System Using Antenna Diversity Combined With Phase and Frequency Hopping"; Sabesan et al.; IEEE Transactions on Antennas and Propagation, vol. 62, No. 2, Feb. 2014 (Year: 2014).*

European Patent Office, "Extended European Search Report from EP Application No. 20185760.4", from Foreign Counterpart to U.S. Appl. No. 16/885,093, dated Dec. 16, 2020, pp. 1 through 25, Published: EP.

* cited by examiner

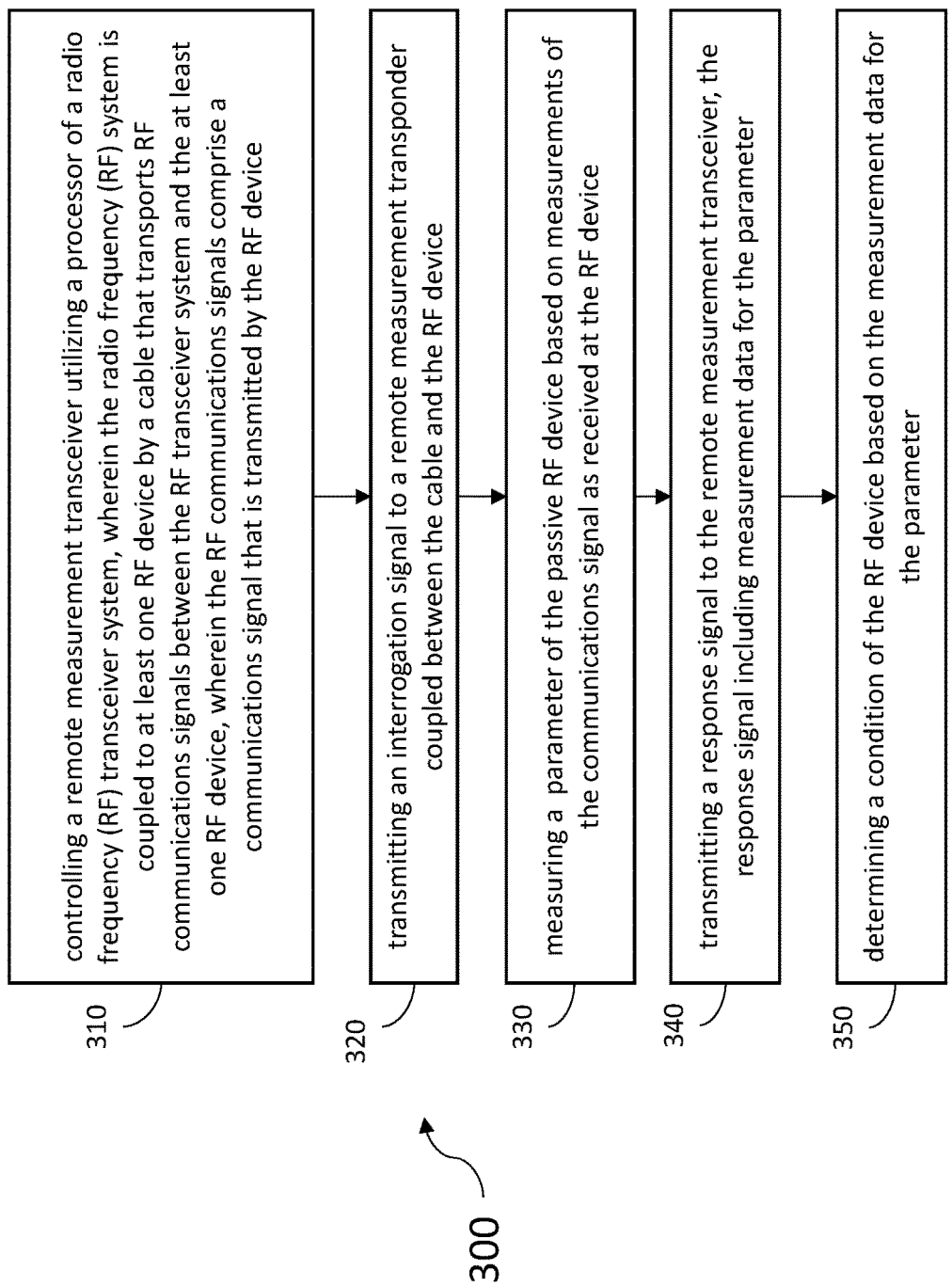

SYSTEMS AND METHODS FOR REMOTE RADIO FREQUENCY DEVICE MONITORING

CROSS-REFERENCE TO RELATED APPLICATION

This application is a U.S. Patent Application claiming priority to, and the benefit of, U.S. Provisional Patent Application No. 62/878,473, titled "SYSTEMS AND METHODS FOR REMOTE RADIO FREQUENCY DEVICE MONITORING" and filed on Jul. 25, 2019, which is incorporated herein by reference in its entirety.

BACKGROUND

A typical distributed antenna system (DAS) includes a master unit that is communicatively coupled with a plurality of remote antenna units. Each remote antenna unit can be coupled directly to one or more of the master units or indirectly via one or more other remote antenna units and/or via one or more intermediary or expansion units. A DAS is typically used to improve the coverage provided by one or more base stations that are coupled to the master unit. These base stations can be coupled to the master unit via one or more cables or via a wireless connection, for example, using one or more donor antennas. The wireless service provided by the base stations can include commercial cellular service and/or private or public safety wireless communications.

It is not uncommon for RF communications systems, such as a DAS, to be supervised from centralized control centers. Technicians can solve problems more quickly if the hardware and software-based failure detection subsystems are working accurately. One elementary parameter of proper RF communications systems performance is the reflection coefficient as measured at the interface between the output of the RF electronics and a cable that connects the RF electronics to an antenna. The reflection coefficient F describes how well an impedance of the RF electronics is matched to the characteristic impedance of the cable and antenna. The reflection coefficient F may be defined by the ratio between reflected reverse and transmitted forward waves at the point of the measurement. Under normal system operation, the cable and antenna should be well matched and cause only minor reflections back to the RF electronics. But in case of damage (for example, a broken cable or shorted antenna), the reflection coefficient at the output of the RF electronics increases significantly and an essential amount of RF power is reflected instead of being transmitted by the antenna. A reflection coefficient detector is one tool that may be used to measure the magnitude of the reflection coefficient with good accuracy over a wide range of different reflection coefficient magnitudes. However, the ability to detect changes of the antenna or cable reflection coefficient can suffer from additional insertion losses that are introduced by intervening components (for example, long cables, splitters, hybrids, and other devices) between the reflection coefficient detector and the antenna. For example, an antenna may be may expected to present at least 10 dB of return loss during normal operation. However, if a faulty antenna's return loss ($|RL_{antenna}|$) is 5 dB and the cable insertion loss ($|IL|$) of an intervening cable is 3.5 dB, then the reflection measurement at the RF electronics output to the cable ($|RL_{out}|$) will be read as 12 dB instead of the actual 5 dB.

SUMMARY

In one embodiment, a radio frequency (RF) communication system comprises: a RF transceiver system; a RF device coupled to the RF transceiver system by at least one cable, wherein the RF transceiver system is configured to transmit an RF signal to the RF device via the at least one cable; a remote measurement transceiver in communication with a processor of the RF transceiver system; a remote measurement transponder coupled between the at least one cable and the RF device; wherein the processor controls the remote measurement transceiver to transmit an interrogation signal to the remote measurement transponder; wherein the remote measurement transponder, in response to the interrogation signal, determines a first parameter of the at least one RF device based on the RF signal as detected at the RF device, and transmits a response signal to the remote measurement transceiver comprising measurement data that includes the first parameter; wherein the remote measurement transceiver outputs the measurement data to the processor of the RF transceiver system.

DRAWINGS

FIG. 3 is a flow chart illustrating an example method embodiment.

In accordance with common practice, the various described features are not drawn to scale but are drawn to emphasize. Reference characters denote like elements throughout figures and text.

DETAILED DESCRIPTION

Figure 1:
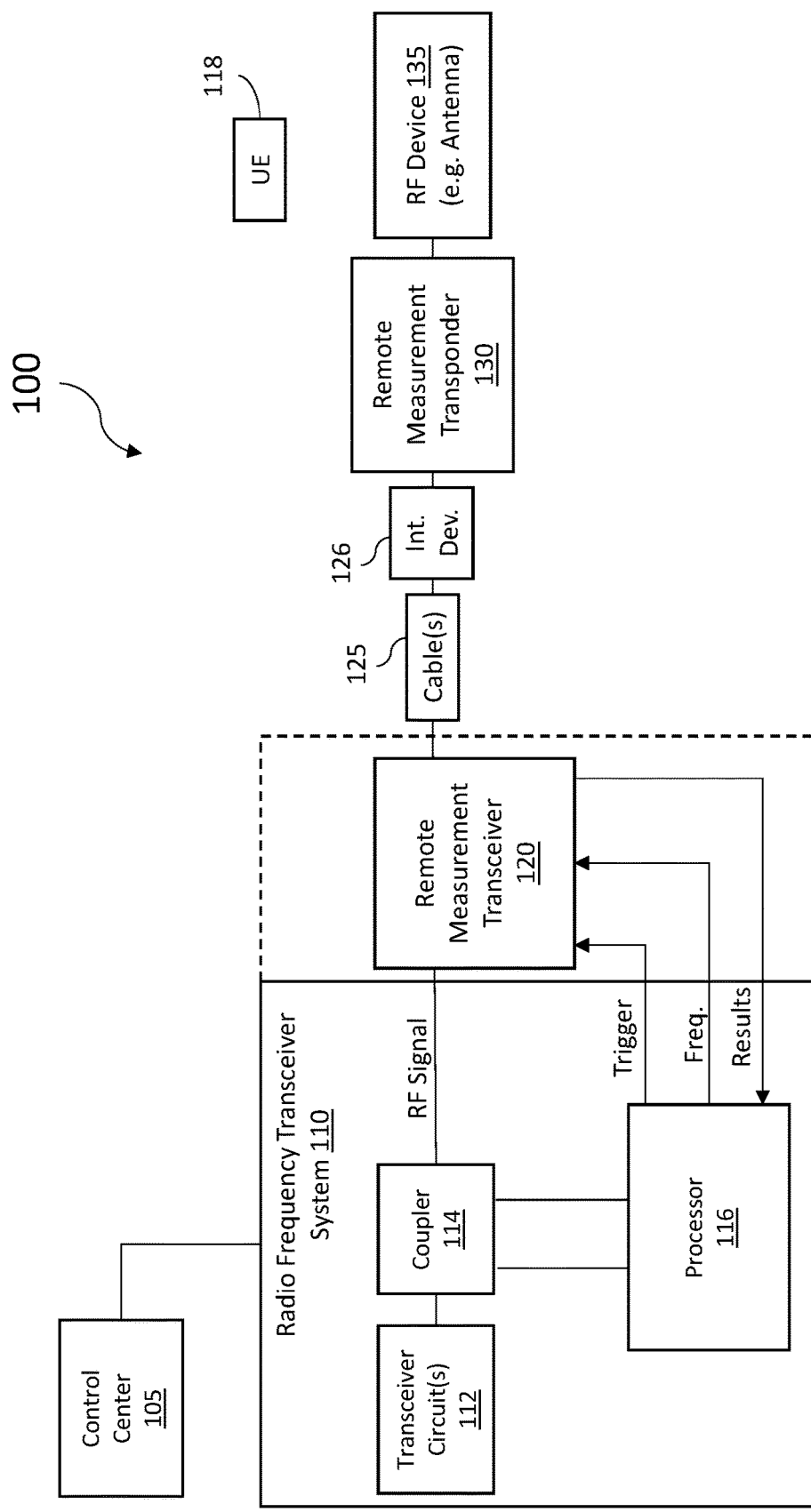
FIGS. 1, 1A and 1B are block diagrams illustrating an example embodiment of a communication system with remote RF element monitoring.

In the following detailed description, reference is made to the accompanying drawings that form a part hereof, and in which is shown by way of specific illustrative embodiments. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments presented herein improve the ability to detect changes at an RF transceiver system's output, independent of any additional RF path insertion loss introduced by intervening components in the RF path. Substantial insertion losses (for example, insertion losses of greater than or equal to about 3 dB) may be caused by any number of components such as, but not limited to, long cable routes, the use of radiation cables, hybrid couplers, directional couplers, splitters, combiners, filters, duplexers, active antenna arrays or other RF components (whether passive or active).

In particular, in some embodiments, a remote measurement system comprises a remote measurement transceiver and at least one remote measurement transponder. The remote measurement transceiver may be positioned close to, or directly attached to, the RF output of an RF transceiver system. The remote measurement transponder may be placed in a remote position away from the RF transceiver system, close or directly attached to a RF device (for example, directly attached at an antenna interface). As used in the following description, "directly attached" to a device means the remote measurement transponder is coupled at the input or output interface/port for the device. For example, a remote measurement transponder can be directly attached at a RF device is attached such that it is able to measure the RF signal as that RF signal is applied to the input interface/port of the RF device without the influence of insertion loss from other components. In some embodiments, the remote measurement transceiver may be integrated within the RF transceiver system while the remote measurement transponder is integrated within the RF device. For the purpose of this disclosure, a remote measurement transceiver integrated within the RF transceiver system would be an example of a remote measurement transceiver that is considered directly attached to the RF transceiver system. Similarly, a remote measurement responder integrated within the RF device would be an example of a remote measurement responder that is considered directly attached to the RF device. In some embodiments, the remote measurement transceiver is coupled to at least one remote measurement transponder using the RF cabling as a transmission channel. It should be understood that embodiments are not limited only to obtaining RF measurements, but that other measurements such as but not limited to temperature, humidity, currents, voltages can be obtained by the remote measurement transponder. As explained below, the remote measurement transceiver in some embodiments may be controlled by a processing unit in the RF transceiver system so that it can set the RFID signal frequencies and trigger measurements remotely (that is, from the RF transceiver system or another device or system that is upstream from the RF transceiver system).

FIG. 1 is a block diagram illustrating an example of a radio frequency (RF) communication system 100 that utilizes one embodiment of RF device monitoring of the present disclosure. In this embodiment, an RF transceiver system 110 is coupled to a RF device 135 via at least one electrically conductive cable 125. In this embodiment, RF transceiver system 110 comprises at least one transceiver circuit 112 (which may be implemented using RF transmitter and/or receiver circuitry), an RF coupler 114 (which may comprise a directional coupler), and a processor 116.

In some embodiments, the RF device 135 may be a device located in the downlink direction from the RF transceiver system 110. In that case, in the downlink direction, the transceiver circuit 112 generates or repeats and amplifies (for example, via one or more power amplifiers (PAs)) downlink RF signals that are transported to the RF device 135 via the cable 125. In the uplink direction, the transceiver circuit 112 amplifies (for example, via one or more low noise amplifiers (LNAs)) and receives uplink RF signals from the RF device 135 via the cable 125. In some embodiments, the RF device 135 may comprise an antenna, in which case the downlink RF signals may be wirelessly transmitted to, and the uplink RF signals wirelessly received from, user equipment (UE) 118 (which may include any form of stationary or mobile wireless communication device).

In other embodiments, the RF device 135 may be a device located in the uplink direction from the RF transceiver system 110. In that case, in the uplink direction, the transceiver circuit 112 generates or repeats and amplifies (for example, via one or more power amplifiers (PAs)) downlink RF signals that are transported to the RF device 135 via the cable 125. In the downlink direction, the transceiver circuit 112 amplifies (for example, via one or more low noise amplifiers (LNAs)) and receives downlink RF signals from the RF device 135 via the cable 125. In some embodiments, where the RF device 135 comprises an antenna, the uplink RF signals are wirelessly transmitted to, and the downlink RF signals wirelessly received from, further uplink devices such a but not limited to a base station.

It should be understood that the RF transceiver system 110 is not limited to any particular RF technology, and for example, may comprise a basestation, a repeater system, a remote antenna unit of a distributed antenna system, or a stand-alone transceiver station. That is, the embodiments described herein may be applied to any RF communication system where insertion loss caused by intervening components between a transceiver circuit 112 and a RF device 135 would interfere with obtaining accurate reflection or other RF measurements of the RF device 135.

In RF communication system 100, a remote measurement system is employed to obtain measurements of parameters by using a remote measurement transponder 130 located at the RF device 135 and a remote measurement transceiver 120 that controls the remote measurement transponder 130 to obtain a measurement. These parameters may be RF parameters (RF power reflection at the RF device 135, for example), or other parameters (temperature, humidity, currents, or voltages for example). In one embodiment, in operation, the processor 116 sends a trigger signal to the remote measurement transceiver 120, which in turn transmits an interrogation signal via the cable 125 (such as an RFID interrogation signal, for example) to the remote measurement transponder 130. The remote measurement transponder 130 obtains a measurement of the parameter (such as the reflection coefficient, or any other measurement, for example) and sends a response signal (such as an RFID response signal, for example) back to the remote measurement transceiver 120. The remote measurement transponder 130 encodes or otherwise includes the measurement data in the response signal. The remote measurement transceiver 120 extracts the measurement data from the response signal and outputs the measurement data to the processor 116. In the case of RF parameter measurements, because, in this example embodiment, the RF parameter is measured directly at the input to the RF device 135, it will not contain inaccuracies due to the insertion losses of the cable 125. As discussed below, other sources of insertion losses may include other intervening devices (shown at 126) such as, but not limited to, hybrid couplers, directional couplers, splitters, duplexers, circulators and other components in the signal path between the RF transceiver system 110 and the RF device 135. For example, FIG. 1C (discussed below) illustrates implementations with intervening devices 126 comprising a splitter/combiner 180 and a coupler 182, while FIG. 1D (discussed below) illustrates an implementation with an intervening device 126 comprising a circulator 184.

In some embodiments, the remote measurement transceiver 120 and remote measurement transponder 130 establish a communications link over the cable 125 (and if present, through one of other intervening devices 126). In other embodiments, such as shown in FIGS. 1E and 1F, this communication link may instead be initiated through a separate over-the-air connection (discussed below). In some embodiments, a communications link may be implemented using another protocol. Although FIG. 1 illustrates the remote measurement system in use with an RF communication system 100 having a single antenna architecture, in other embodiments (such as described below), the remote measurement system may be used with multi-antenna architectures, and thus may establish multiple instances of said communications links.

Figure 1A:
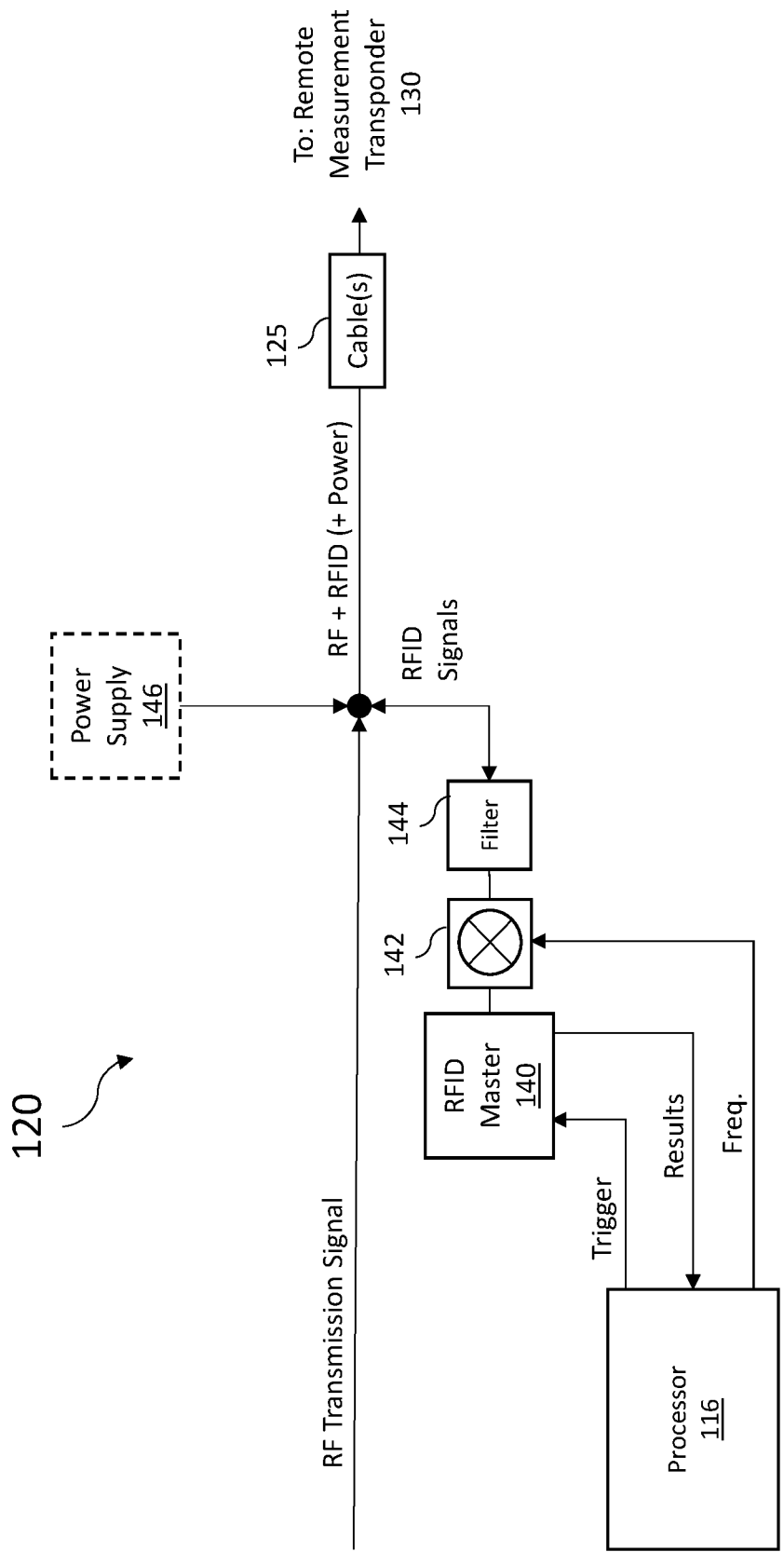

FIG. 1A is a block diagram illustrating an example embodiment of a remote measurement transceiver 120. It should be understood that, while in some embodiments the remote measurement transceiver 120 may be implemented as a device separate from the RF transceiver system 100, in other embodiments it may be integrated within the RF transceiver system 100. In the embodiment shown in FIG. 1A, the remote measurement transceiver 120 comprises an RFID master circuit 140 (which may be implemented using an RFID tag chip or integrated circuit (IC)), an RF mixer 142, a filter 144, and a modular power supply 146. In some embodiments, the modular power supply 146 may optionally be used to provide AC or DC power via the cable 125 to the remote measurement transponder 130. The RFID master circuit 140 is coupled to the processor 116 of the RF transceiver system 110 to a receive a trigger signal input from the processor 116 and provide measurement data (the reflection coefficient, for example) to the processor 116. In some embodiments, the RFID interrogation signal output from the RFID master circuit 140 is frequency shifted by the RF mixer 142 to a frequency that can be transported via cable 125 to the remote measurement transponder 130. That is, while the cable 125 may be frequency independent, in some embodiments frequency dependent intervening components may be present in the RF signal path that would block a standard RFID signal operating at low frequencies. Therefore, the RFID interrogation signal would be frequency shifted (upconverted, for example) by the RF mixer 142 to a frequency range not within or proximate to the operation frequency range of communications traffic transported by the RF transceiver system 100, but at a frequency which allows the RFID interrogation signal to reach the remote measurement transponder 130 at a sufficient power level. Similarly, in such a system the RFID response signal carrying the measurement data from the remote measurement transponder 130 would likewise have been frequency shifted. In that case, the RF mixer 142 may frequency shift (down-convert, for example) the RFID response signal before its input to the RFID master circuit 140. In some embodiments, processor 116 provides a frequency signal to control the frequency shifting applied by the RF mixer 142. It should be understood that where the signal path is frequency independent, the remote measurement transceiver 120 may supply and receive the RFID signals directly without a need for frequency shifting.

Figure 1B:
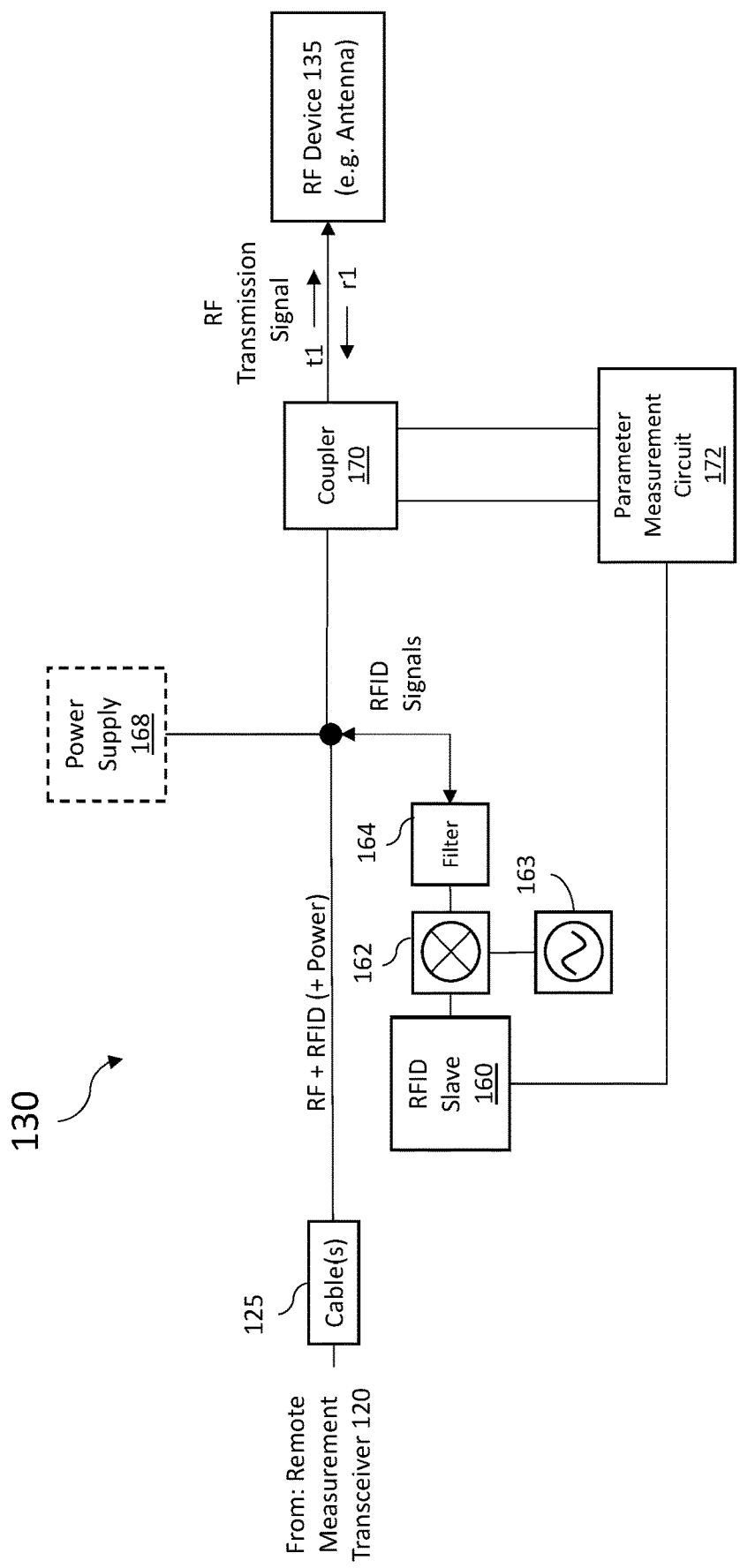
Figure 1C:
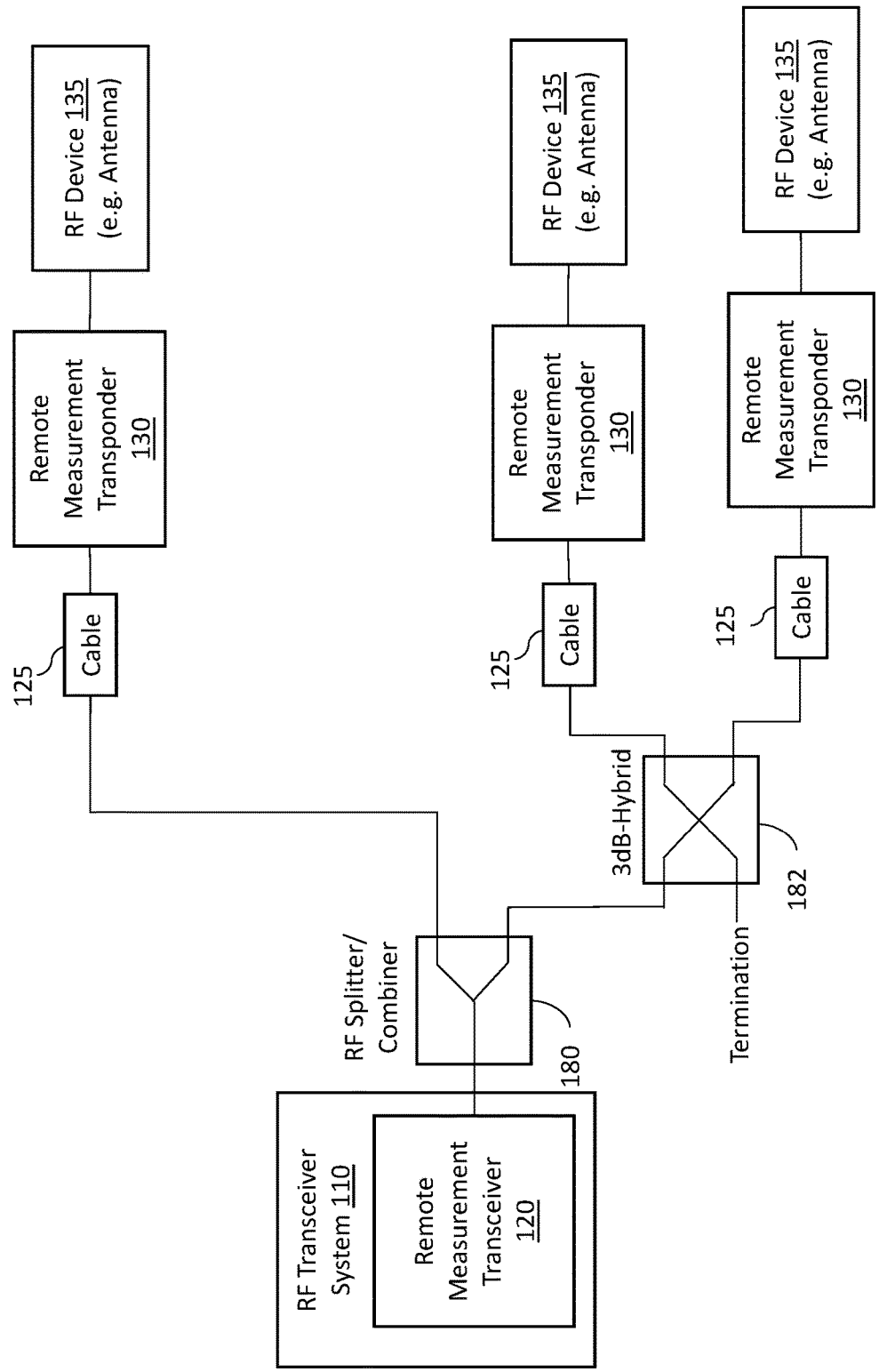
FIG. 1C is a block diagram illustrating an example embodiment of a communication system with remote RF element monitoring for multiple remote RF elements.

FIG. 1B is a block diagram illustrating an example embodiment of a remote measurement transponder 130. It should be understood that, while in some embodiments the remote measurement transponder 130 may be implemented as a device separate from the RF device 135, in other embodiments it may be integrated within the RF device 135. In the embodiment shown in FIG. 1B, the remote measurement transponder 130 comprises an RFID slave circuit 160 (which may be implemented using an RFID tag chip or integrated circuit (IC)), an RF mixer 162, frequency generator circuit 163 (for example, an oscillator), a filter 164, a modular power supply 168, a coupler 170 (which may be a directional coupler), and a parameter measurement circuit 172 coupled to the coupler 170. In some embodiments, the RFID slave circuit 160 may be powered directly from the RFID interrogation signal transmitted by the RFID master circuit 140. In some embodiments, the modular power supply 168 may optionally be used to extract AC or DC power generated by the modular power supply 146 in the measurement transceiver 120 being transmitted over the cable 125 to power the components of the remote measurement transponder 130.

In some embodiments, the RFID slave circuit 160 may comprise an integrated microcontroller so that the parameter measurement circuit 172 can output analog signals that are converted to digital and further processed by the RFID slave circuit 160 to produce the response signal carrying the measurement data back to the RFID master circuit 140. Alternatively, in some embodiments the RFID slave circuit 160 may transmit a response signal carrying digital representation of the analog measurement results derived by the parameter measurement circuit 172. The processor 116 may receive that digital representation and from it calculate the desired measurement data.

In FIG. 1B, an RF power reflection measurement may be obtained by the parameter measurement circuit 172 at the antenna or other device 135. In one embodiment, a reflected wave (r1) signal received back from the RF device 135 is separated by a directional coupler 170 from the transmitted wave (t1) sent to the RF device 135. In some embodiments, the parameter measurement circuit 172 may include power detectors to measure the power levels of coupled portions of the forward travelling wave, reverse travelling wave respectively, and convert the power levels into representative voltages that are proportional to the power levels and represent the forward and reverse travelling waves. The voltages can be converted with analog-digital converters into digital data used to calculate the reflection coefficient magnitude $|\Gamma_{antenna}|$, as observed at the connection point to the RF device 135, or obtain the equivalent antenna return loss measurement $|RL_{antenna}|$, where $|RL_{antenna}| 20 \cdot \log(|\Gamma_{antenna}|^{-1})$. The remote measurement data (whether $|\Gamma_{antenna}|$ or $|RL_{antenna}|$) computed by the parameter measurement circuit 172 can then be transmitted back to the RFID master circuit 140 over the cable 125 and reported to the processor 116. For example, in one embodiment, the remote measurement data is computed by the reflection measurement circuit 172 and the result converted by the RFID slave circuit 160 to an RFID signal for transmission onto the cable 125. In some embodiments, the RFID signal may be frequency shifted (up-converted, for example) by a mixer 162 and applied through a filter 164 prior to transmission onto the cable 125. In some embodiments, the frequency generator circuit 163 provides a frequency signal to control the frequency shifting applied by the RF mixer 162. The remote measurement data received by the RFID master circuit 140 is thus a measurement that is free from any insertion loss caused by the cable 125 (or any intervening devices 126). It should be understood that this particular method for obtaining the $|\Gamma_{out}|$ is provided as an example only and that in other embodiments, the reflection measurement circuit 172 may use other analog or digital methods to determine a reflection coefficient magnitude $|\Gamma_{out}|$, or other RF parameters (such as disclosed in U.S. Provisional Patent Application No. 62/755,951, titled "METHODS AND APPARATUSES FOR REFLECTION MEASUREMENTS" filed on Nov. 5, 2018, which is incorporated herein by reference in its entirety).

However, in some cases it may be advantageous to be able to compare remote measurement data ($|\Gamma_{antenna}|$ or $|RL_{antenna}|$) with the equivale parameters ($|\Gamma_{out}|$ or $|RL_{out}|$) as measured directly at the output of the RF transceiver system 110 prior to the cable 125, where the insertion loss ($|IL|$) of the cable 125 will have an effect on the measurements obtained. The reflection coefficient $|\Gamma_{out}|$, which is measured at the RF output of RF transceiver system 110, is a composition of the forced impedance matching induced by the cable loss and the antenna's reflection coefficient $|\Gamma_{antenna}|$, such that $|\Gamma_{out}|=|\Gamma_{antenna}|\cdot|S_{21,cable}|$. The corresponding $|RL_{antenna}|$ can be determined from $|RL_{out}|=2\cdot|IL|+|RL_{antenna}|$, where $|IL|=20\cdot\log(S_{21,cable}|)$. As such, in some embodiments, the directional coupler 114 located in the RF transceiver system 110 separates the reflected wave signal received back from the cable 125 from the transmitted wave transmitted out by the RF transceiver system 110 to the RF device 135 via cable 125. In some embodiments, RF transceiver system 110 may include power detectors to measure the power levels of coupled portions of the forward travelling wave and reverse travelling wave respectively, convert the power levels into representative voltages that are proportional to the power levels and represent the forward and reverse travelling waves as observed at the output of the RF transceiver system 110. The voltages can be converted with analog-digital converters into digital data to be used by the processor 116 to calculate the reflection coefficient magnitude $|\Gamma_{out}|$, as observed at the connection point of the RF transceiver system 110 to the cable 125, and/or obtain the equivalent system return loss measurement $|RL_{out}|$. Obtaining antenna's reflection coefficient $|\Gamma_{antenna}|$ using the remote measurement transponder, while locally obtaining the RF transceiver system 110's system output reflection coefficient $|\Gamma_{out}|$ allows the processor 116 to take both results into account and compare them with each other. For example, in one embodiment, the measurement data for $|\Gamma_{antenna}|$ and $|\Gamma_{out}|$ can be compared to determine the dominant source of error in case a failure or degradation in the communication system 100 is detected. In some embodiments, the measurements may be used to determine if changes in the measured system output reflection coefficient $|\Gamma_{out}|$ are the results of degradations to antenna performance versus changes in the forced impedance matching induced by the cable's insertion loss in the RF path. For example, in some embodiments comprising a single antenna system, when the processor 116 observes a change in the locally derived reflection coefficient magnitude $|\Gamma_{out}|$, it may then trigger an RFID interrogation signal to remote measurement transponder(s) 130 to obtain the remotely measured antenna's reflection coefficient $|\Gamma_{antenna}|$. From there, the processor 116 may calculate an estimate for the currently existing cable insertion loss $|IL|$ and compare both the $|IL|$ estimate and remotely measured $|\Gamma_{antenna}|$ to historical values for these parameters (e.g., recorded measurements obtained during system deployment) to isolate potential causes of the observed change in the system output reflection coefficient $|\Gamma_{out}|$.

As mentioned above and shown in FIG. 1C, in some embodiments, a single RF transceiver system 110 may be coupled to a plurality of separate RF device 135 via cables 125, where cable branches are implemented using one or more RF combiner/splitters 180 and/or one or more hybrids 182. Devices such as RF combiner/splitters 180 and hybrids 182 are typically frequency dependent devices, which means they act as devices that will pass within certain RF frequency ranges, but not outside of those ranges. In some implementations of such embodiments, the RFID interrogation signals and response signals may be frequency shifted (for example, upconverted) to a frequency within those ranges which are passed by the RF combiner/splitters 180 and hybrids 182 for the purpose of communication these signals between the remote measurement transceiver 120 and the remote measurement transductor(s) 130, such as previously described in this disclosure above. It should also be appreciated that the presence of such frequency dependent devices in the signal path may inhibit delivery of power over the cables 125 to the remote measurement transponder(s) 130. As such, in some embodiments, the remote measurement transponder(s) 130 may be configured to utilize power sources available to them at their location, may be self-powered (for example, by batteries), or may use renewable resources (for example, the remote measurement transponder 130 may comprise or be coupled to a photovoltaic energy device). Moreover, in some embodiments, each of the multiple remote measurement transductors 130 may be assigned an identification (ID) code. In such an embodiment, when the remote measurement transceiver 120 sends out interrogation signal, it can include in the interrogation signal the ID code of the remote measurement transponder 130 it is seeking to communicate with. The interrogation signal can be expected to reach each of the multiple transponders 130, but only the transponder 130 associated with the ID code in the interrogation signal respond to the remote measurement transceiver 120. In some embodiments, the response signals generated by the remote measurement transponders 130 will likewise include the ID code for the remote measurement transponder 130 that generated the response signal. In this way, the remote measurement transceiver 120 can identify which sets of measurement data are obtained from which remote measurement transponder 130.

Selective transmission of interrogation signals with ID codes may also be utilized by the processor 116 to identify cable faults. For example, the processor 116 may have the remote measurement transceiver 120 periodically poll each of the remote measurement transponders 130. A failure to receive a response signal in reply from a given remote measurement transponder 130 may indicate to the processor 116 that a fault exists in the cable 125 to the remote measurement transponder 130 that did not reply.

Furthermore, in some embodiments, a RF parameter such as the reflection coefficient may first be measured by the RF transceiver system 110 as a superposition of all RF devices 135 during normal operation. Then, if a change in that RF parameter is detected, the processor 116 can initiate the capture of additional measurements from the installed remote measurement transponders 130 to detect failures and/or the source of the error.

Figure 1D:
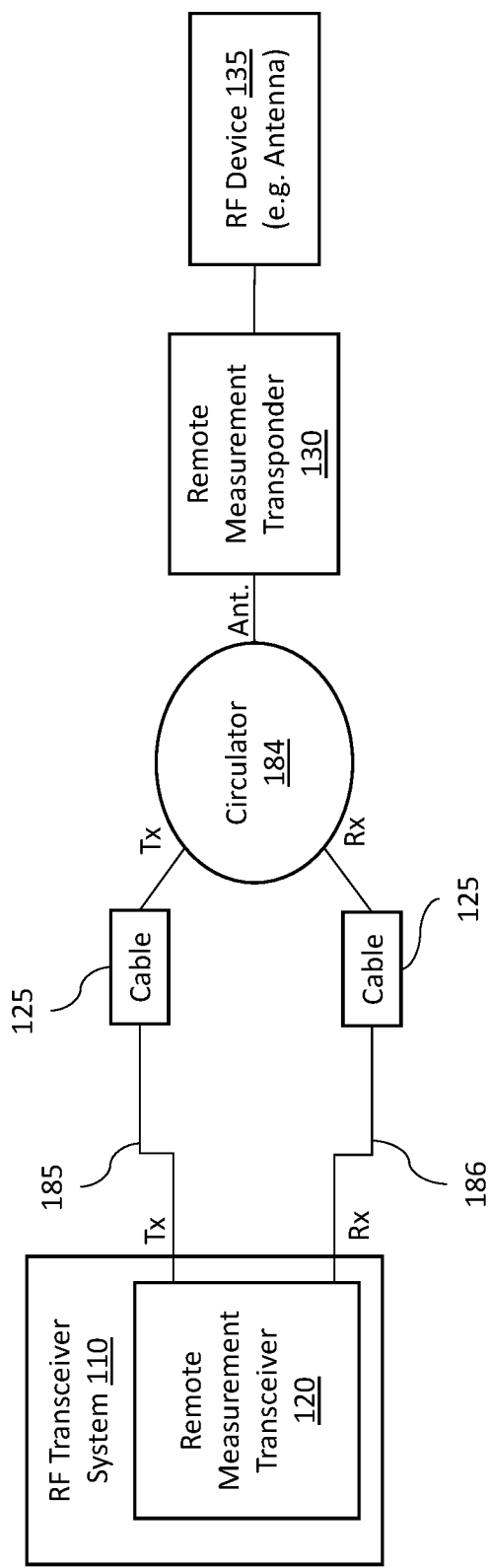
FIG. 1D is a block diagram illustrating an example embodiment of remote RF element monitoring for a communication system comprising an intervening circulator.
Figure 1E:
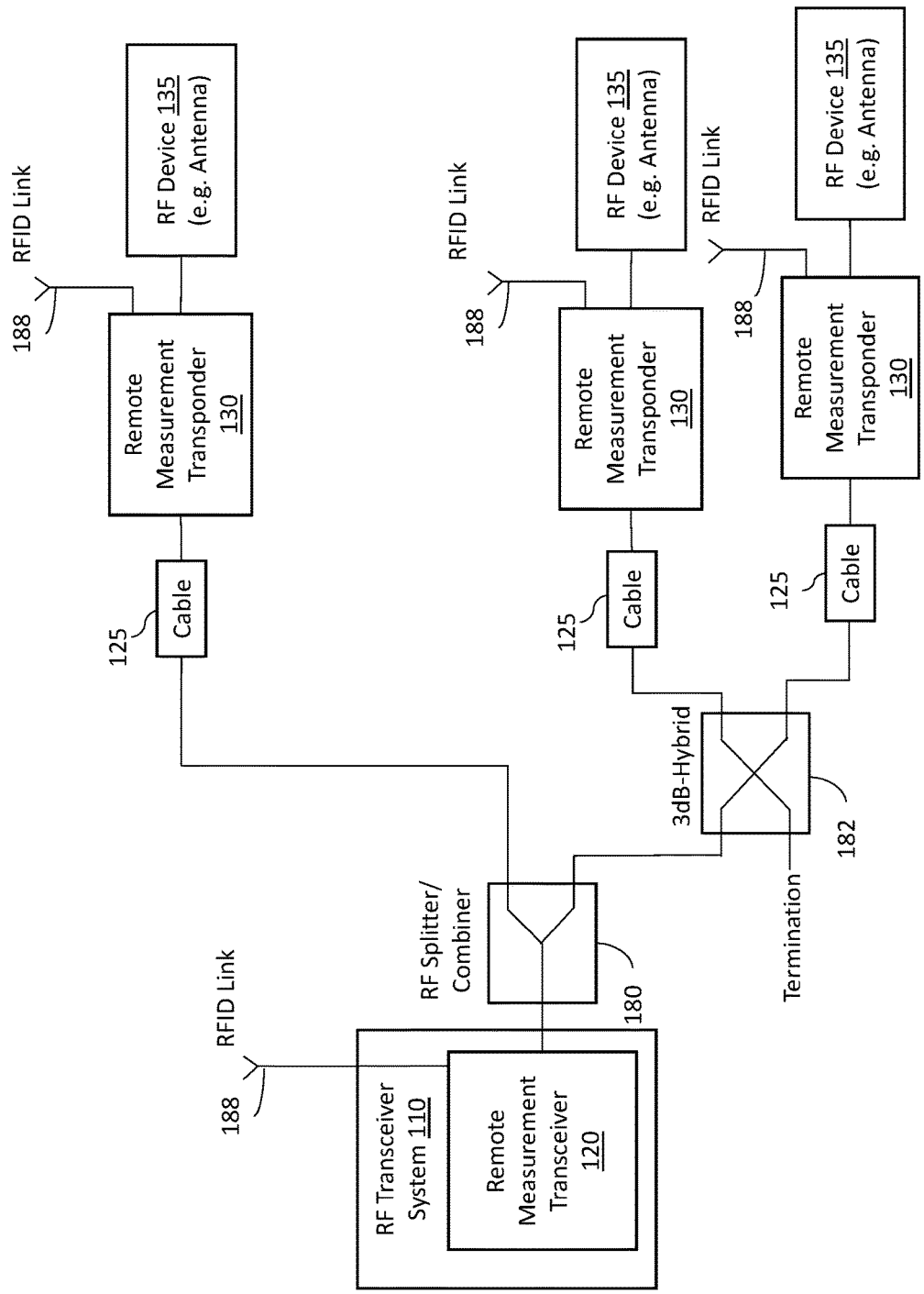
FIG. 1E is a block diagram illustrating an example embodiment of another communication system with remote RF element monitoring for multiple remote RF elements.
Figure 1F:
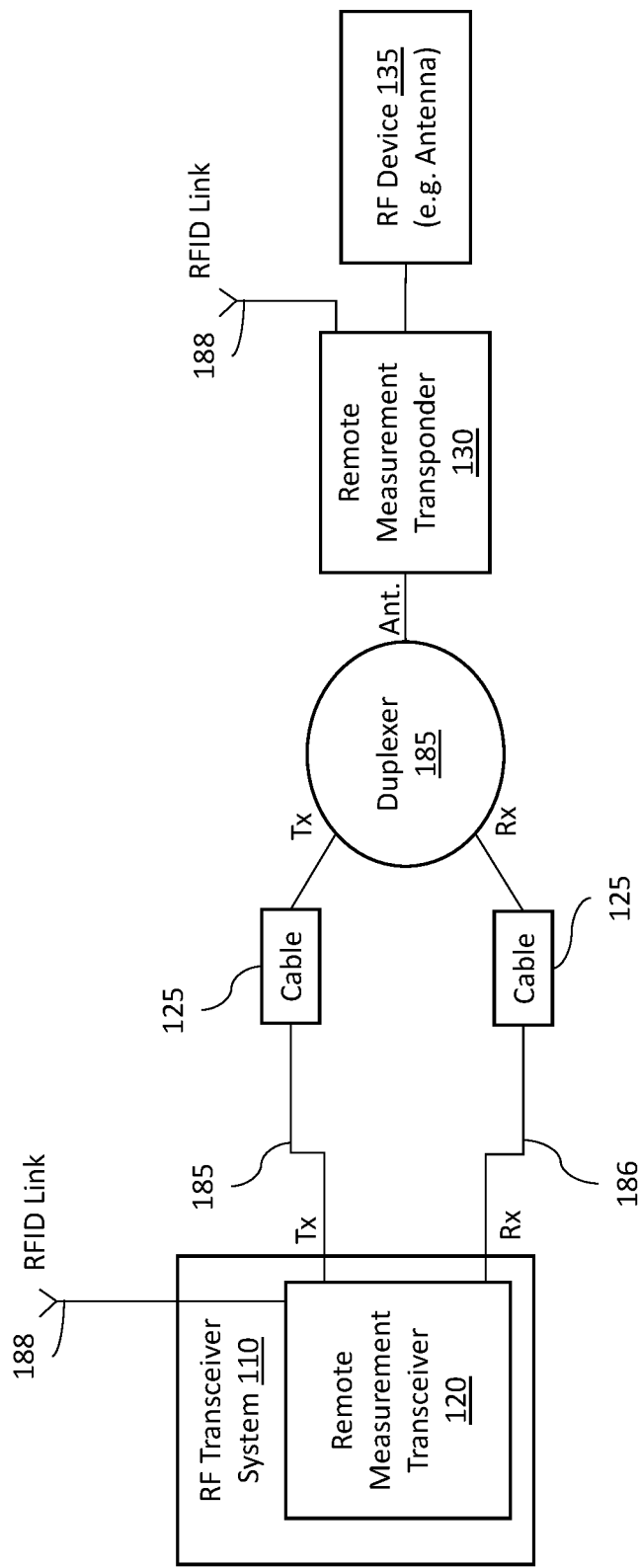
FIG. 1F is a block diagram illustrating an example embodiment of remote RF element monitoring for a communication system comprising an intervening duplexer.

FIG. 1D illustrates another example RF communication system 100 where the intervening device(s) 126 comprise a circulator 184. More specifically, the RF transceiver system 110 comprises transmit (TX) and receive ports (RX) that are coupled to the RF device 135 through a circulator 184. The circulator 184 provides isolation between the TX and RX ports of the RF transceiver system 110 while simultaneously passing transmitted signal from the RF transceiver system 110 TX port to the RF device 135, and received signals from RF device 135 to the RF transceiver system 110 RX port. In such an embodiment in operation, the processor 116 sends a trigger signal to the remote measurement transceiver 120, which in turn transmits an interrogation signal via the cable 125 coupled to the RF transceiver system 110 TX port. The interrogation signal is passed by the circulator 184 from the circulator 184 TX port to and out of the circulator 184 ANT port to the remote measurement transponder 130. The remote measurement transponder 130 obtains a measurement of the RF parameter and sends a response signal back to the circulator 184 ANT port. The response signal is passed by the circulator 184 from the circulator 184 ANT port to and out of the circulator 184 RX port to the to the RF transceiver system 110 RX port, where it is read by the remote measurement transceiver 120. The remote measurement transceiver 120 can thus provide to the processor 116 accurate reflection or other RF measurements of the RF device 135 without inaccuracies introduced by insertion losses WO of the circulator 184.

In some circumstances, it may be more desirable to initiate a separate over-the-air (OTA) connection instead of using the cables 125 to carry the communication link between the between an RFID master circuit 140 and an RFID slave circuit 160. Such may be the case, for example, in multi-user, multi-frequency band RF systems, where it is difficult to find a non-harmful RFID frequency for conducting interrogation and response signal transmissions. FIG. 1E therefore illustrates an alternate version of the RF communication system 100 analogous to that shown in FIG. 1C. In this implementation, the remote measurement transceiver 120 and one or more of the remote measurement transponders 130 may comprise a separate antenna 188 used to establish an over-the-air RFID communication link for communicating the interrogation and response signals that were carrier via the cables 125 in FIG. 1C. In some implementations, one or more of the remote measurement transponders 130 may continue to communicate integration and response signals with the remote measurement transceiver 120 via the cables 125 as described in FIG. 1C, while one or more other remote measurement transponders 130 utilize a respective over-the-air RFID communication link established vie the antennas 188.

FIG. 1F illustrates another example RF communication system 100 analogous to that shown in FIG. 1D, where a difference is that the intervening device(s) 126 comprise a duplexer 185 rather than a circulator 184. Duplexers are commonly used in frequency division duplexing (FDD) systems where the uplink signal frequencies are separated from the downlink singal frequencies. Because a duplexer provides a very high isolation for the uplink signal frequencies in the downlink signal band, and vice versa, it may block the communication between an RFID master circuit 140 and RFID slave circuit 160 that are sharing a frequency using time division duplexing (TDD) principles. Accordingly, in FIG. 1F the remote measurement transceiver 120 and remote measurement transponder 130 each have a separate antenna 188 used to establish with each other an over-the-air RFID communication link for communicating the interrogation and response signals that were carried via the cables 125 in FIG. 1D.

Figure 2:
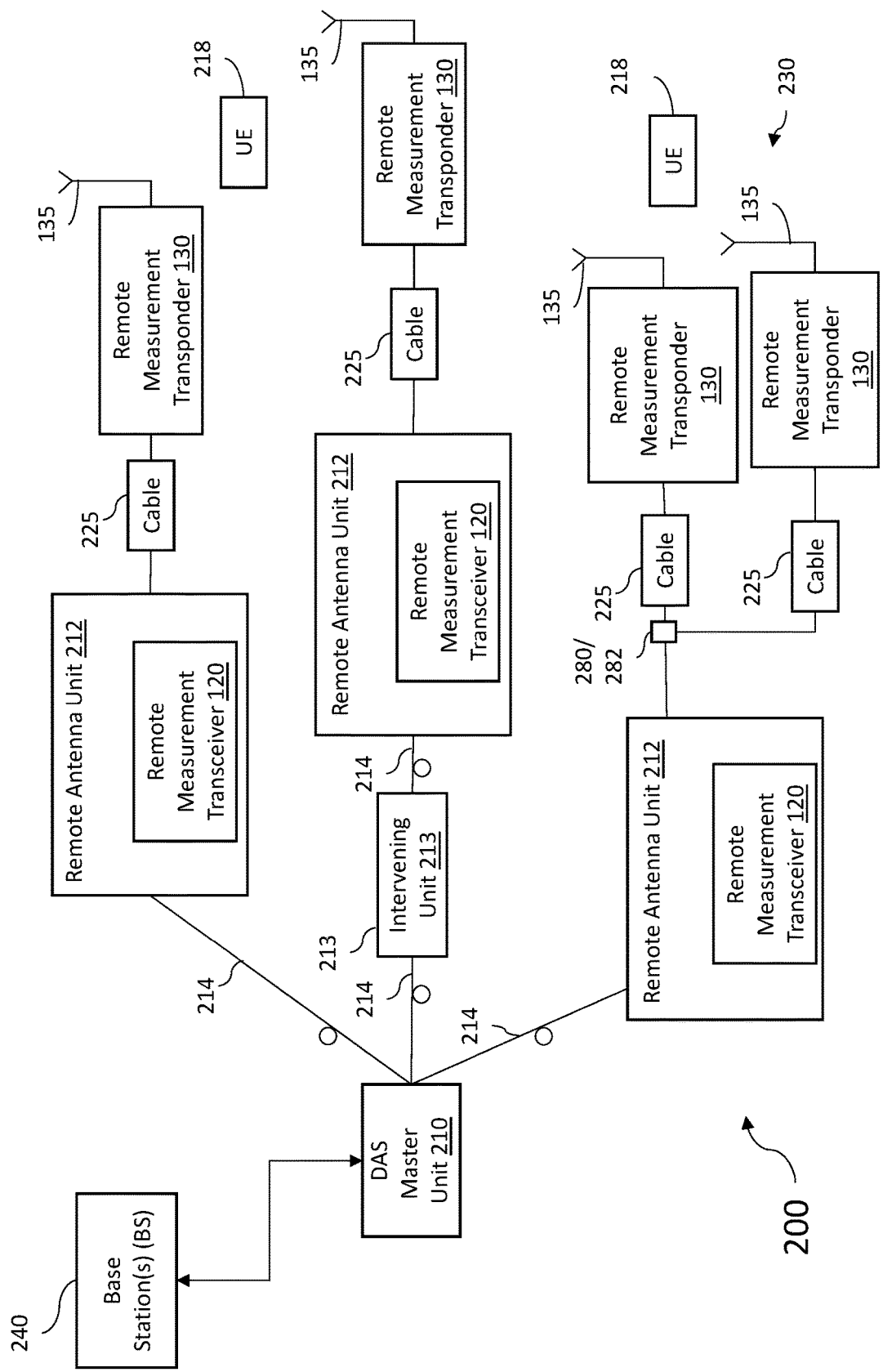
FIGS. 2, 2A, 2B and 2C are block diagrams illustrating an example embodiment of a Distributed Antenna System (DAS) with remote RF element monitoring for multiple remote RF elements.

FIG. 2 is a block diagram of an example distributed antenna system (DAS) 200 embodiment that comprises an implementation of a RF communication system 100 having a remote monitoring system for obtaining remote parameter measurement for RF devices. It should be understood that the features and elements described herein with respect to the DAS 200 and the accompanying description may be used in conjunction with, in combination with, or substituted for elements of any of the other embodiments discussed with respect to RF communication system 100 and vice versa. Further, it should be understood that the functions, structures and other description of elements associated with embodiments described herein may apply to like named or described elements in FIG. 2 and vice versa.

The DAS 200 comprises a master unit 210 that is communicatively coupled to one or more remote antenna units 212 via one or more cables 214, where each of the remote antenna units 212 may define an RF transceiver system 110. In FIG. 2, the RF device 135 is illustrated as comprising an antenna for the remote antenna units 212. However, in other implementations, the RF device 135 may comprise a device other than, or in addition to, an antenna. Although the term "remote antenna unit" is used in this disclosure, those skilled in the art of distributed antenna systems would recognize "remote unit" as being an equivalent term for these elements of a DAS. Each remote antenna unit 212 can be communicatively coupled directly to the master unit 210 or indirectly via one or more other remote antenna units 212 and/or via one or more optional intermediary or expansion units 213.

The master unit 210, remote antenna units 212, and expansion units 213 (if present) may be coupled together by cables 214 that comprise one or more optical fibers, as shown in FIG. 2, and therefore may be referred to as fiber optic cables 214. In such an embodiment, the master unit 210 may be referred to as an optical mater unit (OMU) 210, the remote antenna units 212 may be referred to as optical remote units (ORU) 212, and the expansion units 213 may be referred to as an optical expansion units (OEU) 213. In some embodiments, the cables 214 may operate as a bidirectional transport medium where a common cable 214 may carry uplink and downlink transport signals between the master unit 210 and any particular remote antenna unit 212. In other embodiments, each cable 214 may comprise a pair, or set, of optical cables where one carries uplink transport signals from a remote antenna unit 212 and the other carries downlink transport signals to the remote antenna unit. In should be understood however that in some embodiments, one or more of the cables 214 may instead be implemented using electrically conductive cabling (for example, twisted-pair or coaxial cables).

As shown in FIG. 2, master unit 210 is communicatively coupled to at least one base station 240. Base station 240 can be co-located with the master unit 210 to which it is coupled. Alternatively, a base stations 240 can be located remotely from the master unit 210 to which it is coupled (for example, where the base stations 240 provides base station capacity to an area beyond the coverage area of the DAS 200). In this latter case, the master unit 210 can be coupled to a donor antenna and repeater or bi-directional amplifier in order to wirelessly communicate with the remotely located base stations 240. In this exemplary embodiment, the base stations 240 may comprise a base station that is used to provide public and/or private safety wireless services (for example, wireless communications used by emergency services organizations (such as police, fire and emergency medical services) to prevent or respond to incidents that harm or endanger persons or property). The base stations 240 also can include, in addition to safety base stations, one or more base stations that are used to provide commercial cellular wireless service.

The base station 240 can be coupled to the master unit 210 using a network of attenuators, combiners, splitters, amplifiers, filters, cross-connects, etc., (sometimes referred to collectively as a "point-of-interface" or "POI"). This network can be included in the master unit 210 and/or can be separate from the master unit 210. This is done so that, in the downlink, the desired set of RF channels output by the base station(s) 240 can be extracted, combined, and routed to the appropriate master unit 210, and so that, in the uplink, the desired set of carriers output by the master unit 210 can be extracted, combined, and routed to the appropriate interface of each base stations 240. It is to be understood, however, that this is one example and that other embodiments can be implemented in other ways.

Figure 2A:
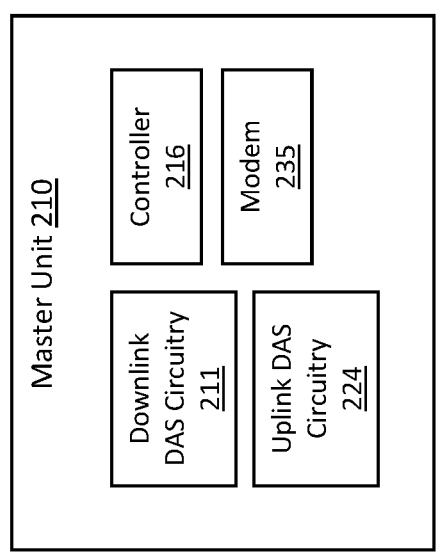

As shown in FIG. 2A, in general, master unit 210 comprises downlink DAS circuitry 211 that is configured to receive one or more downlink signals from the base station 240. These signals are also referred to here as "base station downlink signals." Each base station downlink signal includes one or more radio frequency channels used for communicating in the downlink direction with the user equipment (UE) 218 (which may include cellular phones, tablets, and other mobile user devices, for example) over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol). The downlink DAS circuitry 211 in each master unit 210 is also configured to generate one or more downlink transport signals derived from one or more base station downlink signals and to transmit one or more downlink transport signals to one or more of the remote antenna units 212.

Figure 2C:
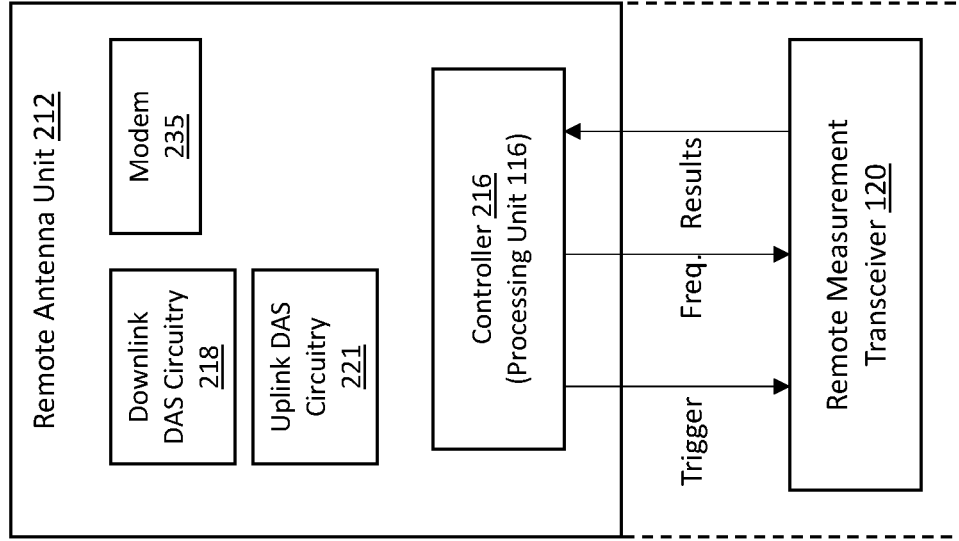
Figure 2B:
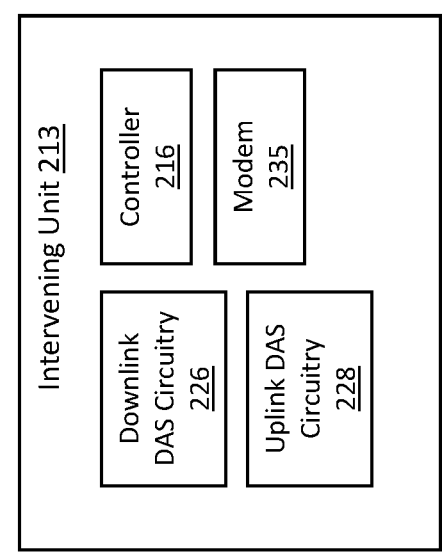

As shown in FIG. 2B, each intermediary expansion unit 213 comprises downlink DAS circuitry 226 that is configured to receive the downlink transport signals transmitted to it from the master unit 210 (or other intermediary unit 213) and transmits the downlink transport signals to one or more remote antenna units 212 or other downstream intermediary expansion units 213. Each intermediary expansion unit 213 comprises uplink DAS circuitry 228 that is configured to receive the respective uplink transport signals transmitted to it from one or more remote antenna units 212 or other downstream intermediary expansion units 213, combine or sum the received uplink transport signals, and transmit the combined uplink transport signals uplink to the master unit 210 or other intermediary unit 213. In other embodiments, one or more remote antenna units 212 are coupled to master unit 210 via one or more other remote antenna units 212 (for examples, where the remote antenna units 212 are coupled together in a daisy chain or ring topology). In such an embodiments, an intermediary unit 213 may be implemented using a remote antenna unit 212.

As shown in FIG. 2C, each remote antenna unit 212 comprises downlink DAS circuitry 218 that is configured to receive the downlink transport signals transmitted to it from the master unit 210 and to use the received downlink transport signals to generate one or more downlink radio frequency signals that are radiated from one or more antennas (which may define a RF device 135) associated with that remote antenna unit 212 for reception by user equipment 118. These downlink radio frequency signals are analog radio frequency signals and are also referred to here as "remote downlink radio frequency signals." Each remote downlink radio frequency signal includes one or more of the downlink radio frequency channels used for communicating with user equipment 118 over the wireless air interface. In this way, the DAS 200 increases the coverage area for the downlink capacity provided by the base station 240. Also, each remote antenna unit 212 comprises uplink DAS circuitry 221 that is configured to receive via antenna 135 one or more uplink radio frequency signals transmitted from the user equipment 118. These are analog radio frequency signals and are also referred to here as "remote uplink radio frequency signals." Each uplink radio frequency signal includes one or more radio frequency channels used for communicating in the uplink direction with user equipment 118 over the relevant wireless air interface. The uplink DAS circuitry 221 in each remote antenna unit 212 is configured to generate one or more uplink transport signals derived from the one or more remote uplink radio frequency signals and to transmit one or more uplink transport signals to one or more of the master units 210.

Each master unit 210 comprises uplink DAS circuitry 224 that is configured to receive the respective uplink transport signals transmitted to it from one or more remote antenna units 212 and to use the received uplink transport signals to generate one or more base station uplink radio frequency signals that are provided to the one or more base station 240 associated with that master unit 210. Typically, this involves, among other things, combining or summing uplink signals received from multiple remote antenna units 212 in order to produce the base station signal provided to each base stations 240. Each base station uplink signal includes one or more of the uplink radio frequency channels used for communicating with user equipment 118 over the wireless air interface. In this way, the DAS 200 increases the coverage area for the uplink capacity provided by the base station 240.

The downlink DAS circuitry 211, 218, and 226 and uplink DAS circuitry 224, 221, and 228 in each master unit 210, remote antenna unit 212, and intermediary unit 213, respectively, can comprise one or more appropriate connectors, attenuators, combiners, splitters, amplifiers, filters, duplexers, analog-to-digital converters, digital-to-analog converters, mixers, field-programmable gate arrays (FPGAs), microprocessors, transceivers, framers, etc., to implement the features described above. Also, the downlink DAS circuitry 211, 218, and 226 and uplink DAS circuitry 224, 221, and 228 may share common circuitry and/or components. For example, some components (such as duplexers) by their nature are shared among the downlink DAS circuitry 211, 218, and 226 and uplink DAS circuitry 224, 221, and 228.

The DAS 200 can use either digital transport, analog transport, or combinations of digital and analog transport for generating and communicating the transport signals between the master units 210, the remote antenna units 212, and any intermediary units 213. For the purposes of illustration, some of the embodiments described here are implemented using analog transport over optical cables. However, it is to be understood that other embodiments can be implemented in other ways, for example, in DASs that use other types of analog transport (for example, using other types of cable and/or using analog transport that makes use of frequency shifting), digital transport (for example, where digital samples indicative of the analog base station radio frequency signals and analog remote radio frequency signals are generated and communicated between the master units 210 and the remote antenna units 212), or combinations of analog and digital transport.

Each unit 210, 212, 213 in the DAS 200 also comprises a respective controller 216. In some embodiments, the controller 216 for a remote antenna unit 212 may further serve as the processing unit 116 discussed above. The controller 216 is implemented using one or more programmable processors that execute software that is configured to implement the various features described here as being implemented by the controller 216. The controller 216 (the various features described here as being implemented by the controller 216) (or portions thereof) can be implemented in other ways (for example, in a field programmable gate array (FPGA), application specific integrated circuit (ASIC), etc.). Each controller 216 is configured to monitor and control the operation of the associated unit. Each controller 216 is also configured to send and receive management data over the DAS 200. In one embodiment, each unit 210, 212, 213 in the DAS 200 also comprises a modem 235 that is configured to send and receive management data over the DAS 200 by modulating and demodulating one or more carrier frequencies that are used for the purpose of communicating management data. In some embodiments (for example, where digital transport is used in the DAS), a separate modem 235 for modulating and demodulating management data is not used and, instead, the management data is combined with the digital DAS transport data before being supplied to the transport transceiver or other physical layer device.

As shown in FIGS. 2 and 2C, in this example DAS embodiment each remote antenna unit 212 includes or is otherwise coupled to a remote measurement transceiver 120. Each remote antenna unit 212 is coupled to one or more antenna 135 via a cable 225. As discussed above, the cable 225, either alone or together with other intervening devices, can contribute to a insertion loss (|IL|) observable at the output of the remote antenna unit 135 that interferes with obtaining RF parameter measurements of the antenna 135. To address this problem, a remote measurement transponder 130 is located at the input to the antenna 135 so that the remote measurement transceiver 120 may obtain accurate reflection or other RF measurements of the antenna 135 in the manner described above, without inaccuracies introduced by the insertion loss (|IL|).

For example, in one embodiment in operation, the remote antenna unit 212 controller 216 may send a trigger signal to the remote measurement transceiver 120 (for example, to the RFID master circuit 140), which in turn transmits the RFID interrogation signal (such as an RFID interrogation signal, for example) via the cable 225 to the remote measurement transponder 130. The remote measurement transponder 130 obtains a measurement of the RF parameter (such as the reflection coefficient, for example), or a measurement of any other parameter (temperature, humidity, currents, or voltages, for example) and sends a response signal (such as an RFID response signal, for example) with the measurement data back to the remote measurement transceiver 120. The remote measurement transceiver 120 extracts the measurement data from the response signal and outputs the measurement data to the controller 216. Because the RF parameter is measured directly at the input to the RF device 135, it will not contain inaccuracies due to the insertion losses of the cable 225 or other intervening devices 126.

In some embodiments, multiple antenna 135 may be coupled to a single remote antenna unit 212 (for example, via a splitter/combiner 180, hybrid 182, or other device) in the same manner as illustrated in FIG. 1C. In embodiments, when the remote measurement transceiver 120 transmits interrogation signals, it can include in the interrogation signal an ID code of the remote measurement transponder 130 it is seeking to communicate with. The transponder 130 associated with the ID code in the interrogation signal will respond to the remote measurement transceiver 120 while other transponders 130 not associated with the ID code may not respond to the interrogation signal. In some embodiments, the response signals generated by the remote measurement transponders 130 will likewise include an ID code for the remote measurement transponder 130 so that the remote measurement transceiver 120 can identify which remote measurement transponder 130 provided a received response signal. Selective transmission of interrogation signals with ID codes may also be utilized by the controller 216 to identify cable faults. For example, the controller 216 may instruct the remote measurement transceiver 120 to periodically poll each of the remote measurement transponders 130. A failure to receive a response signal in reply from a given remote measurement transponder 130 may indicate to the controller 216 that a fault exists in a cable 225 to a remote measurement transponder 130 that did not reply.

In some cases it may be advantageous to be able to compare remote measurement data ($|\Gamma_{antenna}|$ or $|RL_{antenna}|$) obtained by the remote measurement transponder 130 with the equivalent parameters ($|\Gamma_{out}|$ or $|RL_{out}|$) as measure directly at the output of the remote antenna unit 212 prior to the cable 225. Obtaining antenna's reflection coefficient $|\Gamma_{antenna}|$ using the remote measurement transponder, while locally obtaining the remote antenna unit 212's system output reflection coefficient $|\Gamma_{out}|$ allows the controller 216 to take both results into account and compare them with each other, as discussed above. In some embodiments, remote measurement data ($|\Gamma_{anntenna}|$, $|RL_{antenna}|$) and/or locally obtained measurement data ($|\Gamma_{out}|$, $|RL_{out}|$) may be communicated by the controller 216 (for example, via modem 235) to a DAS management system or centralized control center for logging, fault detection, or troubleshooting purposes. In some embodiments, the controller 216 may respond to commands from the DAS management system to initiate the transmission of interrogation signals, adjust operating parameters (such as frequencies used to transmit RFID signals, for example) of the remote measurement transceiver 120 or remote measurement transponder 130, or for adding or deleting remote measurement transponder 130 from the system.

FIG. 3 is a flow chart illustrating generally at 300 an example embodiment of a method for remote radio frequency device monitoring. It should be understood that the features and elements described herein with respect to the method 300 shown in FIG. 3 and the accompanying description may be used in conjunction with, in combination with, or substituted for elements of any of the other embodiments discussed with respect to the other figures, or elsewhere herein, and vice versa. Further, it should be understood that the functions, structures and other description of elements associated with embodiments of FIG. 3 may apply to like named or described elements for any of the other figures and embodiments and vice versa.

The method 300 begins at 310 with controlling a remote measurement transceiver utilizing a processor of a radio frequency (RF) transceiver system, wherein the radio frequency (RF) transceiver system is coupled to at least one RF device by a cable that transports RF communications signals between the RF transceiver system and the at least one RF device, wherein the RF communications signals comprise a downlink communications signal transmitted by the RF device to the one or more units of user equipment within a coverage area of the RF transceiver system. The method proceeds to 320 with transmitting an interrogation signal to a remote measurement transponder coupled between the cable and the RF device. In one embodiment in operation, the processor of the RF transceiver system sends a trigger signal to the remote measurement transceiver, which in turn transmits the interrogation signal via the cable to the remote measurement transponder. In some embodiments, the interrogation signal is an RFID interrogation signal. In some embodiments, a communications link may be implemented between the remote measurement transceiver and the remote measurement transponder using another protocol.

The method proceeds to 330 with the remote measurement transponder measuring an parameter of the RF device based on measurements of the downlink communications signal as received at the RF device, and to 340 with the remote measurement transponder transmitting a response signal to the remote measurement transceiver, the response signal including measurement data for the parameter. For example, the remote measurement transponder obtains a measurement of the parameter (such as the reflection coefficient, a temperature, a humidity, a current, or a voltage, for example) and sends the response signal with the measurement data back to the remote measurement transceiver with the measurement. In some embodiments, the response signal comprises an RFID response signal. The remote measurement transceiver extracts the measurement data from the response signal and outputs the measurement data to the processor. The method 300 proceeds to 350 with determining a condition of the RF device based on the measurement data for the parameter. Because the parameter is measured directly at the input to the RF device, it will not contain inaccuracies due to the insertion losses of the cable or other intervening devices. Sources of insertion losses, in addition to the cable, may include other intervening devices such as, but not limited to, hybrid couplers, directional couplers, splitters, and other components in the signal path between the RF transceiver system and the RF device.

EXAMPLE EMBODIMENTS

Example 1 includes a radio frequency (RF) communication system, the system comprising: a RF transceiver system; a RF device coupled to the RF transceiver system by at least one cable, wherein the RF transceiver system is configured to transmit an RF signal to the RF device via the at least one cable; a remote measurement transceiver in communication with a processor of the RF transceiver system; a remote measurement transponder coupled between the at least one cable and the RF device; wherein the processor controls the remote measurement transceiver to transmit an interrogation signal to the remote measurement transponder; wherein the remote measurement transponder, in response to the interrogation signal, determines a first parameter of the at least one RF device based on the RF signal as detected at the RF device, and transmits a response signal to the remote measurement transceiver comprising measurement data that includes the first parameter; wherein the remote measurement transceiver outputs the measurement data to the processor of the RF transceiver system.

Example 2 includes the system of example 1, wherein to determine the first parameter, the remote measurement transponder measures at least one of: a power of the RF signal, a power of a reflection of the RF signal, a temperature, a humidity, a current, or a voltage.

Example 3 includes the system of any of examples 1-2, wherein the processor determines a second parameter at an output of the RF transceiver system and determines a condition of the RF device based on a function of the first parameter and the second parameter.

Example 4 includes the system of any of examples 1-3, further comprising at least one intervening device coupled to the at least one cable between the RF transceiver system and the RF device, the at least one intervening device having a passband, wherein the remote measurement transponder frequency shifts the interrogation signal to a first frequency that is passed by the passband and the remote measurement transceiver frequency shifts the response signal to a second frequency passed by the passband.

Example 5 includes the system of any of examples 1-4, wherein the at least one intervening device compromises one of a splitter, a coupler, a filter or a duplexer.

Example 6 includes the system of any of examples 1-5, wherein the RF device comprises an antenna, wherein the antenna radiates downlink RF signal frequency signal to one or more instances of user equipment (UE) within a coverage area of the RF transceiver system, and wherein the antenna receives uplink RF signal frequency signal from the one or more instances of user equipment (UE) within the coverage area of the RF transceiver system.

Example 7 includes the system of any of examples 1-6, wherein the remote measurement transceiver comprises: a Radio Frequency Identification (RFID) master circuit in communication with the processor, wherein the processor generates a trigger signal to the RFID master circuit to initiate the interrogation signal.

Example 8 includes the system of example 7, wherein the RFID master circuit reads the measurement data from the response signal and outputs the measurement data to the processor.

Example 9 includes the system of any of examples 7-8, wherein the remote measurement transceiver comprises a mixer, wherein the mixer frequency shifts the interrogation signal based on a frequency input from the processor.

Example 10 includes the system of any of examples 7-9, wherein the remote measurement transponder comprises: a RFID slave circuit in communication with the RFID master circuit; a directional coupler coupled to the at least one cable; a parameter measurement circuit coupled to the directional coupler, wherein the parameter measurement circuit determines the first parameter of the RF device using an output of the directional coupler.

Example 11 includes the system of example 10, wherein the RFID slave circuit is powered from the interrogation signal transmitted by the RFID master circuit or a modular power supply in the remote measurement transceiver.

Example 12 includes the system of any of examples 1-11, wherein the remote measurement transponder comprises a mixer, wherein the mixer frequency shifts the response signal based on a frequency input from a frequency generator circuit.

Example 13 includes the system of any of examples 1-12, wherein the remote measurement transponder is powered via the at least one cable.

Example 14 includes the system of any of examples 1-13, wherein the remote measurement transceiver is coupled to a plurality of remote measurement transponders via the at least one cable and associates each of the plurality of remote measurement transponders with an identification (ID) code.

Example 15 includes the system of any of examples 1-14, wherein the RF transceiver system is a remote antenna unit of a distributed antenna system (DAS), wherein the DAS comprises: a master unit configured to receive a base station downlink radio frequency signal and to transmit a base station uplink radio frequency signal; and a plurality of remote antenna units that are each communicatively coupled to the master unit, the plurality of remote antenna units each configured to radiate a remote downlink radio frequency signal from at least one antenna and to receive a remote uplink radio frequency signal from the at least one antenna.

Example 16 includes a method for radio frequency (RF) device monitoring for an RF transceiver system, the method comprising: controlling a remote measurement transceiver utilizing a processor of an RF transceiver system, wherein the RF transceiver system is coupled to at least one RF device by at least one cable that transports RF communications signals between the RF transceiver system and the at least one RF device; transmitting an interrogation signal to a remote measurement transponder coupled between the at least one cable and the RF device; measuring a first parameter of the RF device based on measurements by the remote measurement transponder of the RF communications signal as received at the RF device; transmitting a response signal from the remote measurement transponder to the remote measurement transceiver, the response signal including measurement data for the parameter; outputting the measurement data from the remote measurement transceiver to the processor and determining a condition of the RF device based on the measurement data for the first parameter.

Example 17 includes the method of example 16, further comprising: determining a second parameter at an output of the RF transceiver system, wherein determining the condition of the RF device is based on the first parameter and the second parameter.

Example 18 includes the method of any of examples 16-17, wherein at least one intervening device is coupled to the at least one cable between the RF transceiver system and the RF device, the at least one intervening device having a passband, the method further comprising: frequency shifting the interrogation signal to a first frequency that is passed by the passband and frequency shifting the response signal to a second frequency passed by the passband.

Example 19 includes the method of any of examples 16-18, wherein the remote measurement transceiver comprises a Radio Frequency Identification (RFID) master circuit in communication with the processor, wherein the processor generates a trigger signal to the RFID master circuit to initiate the interrogation signal; and wherein the remote measurement transponder comprises a RFID slave circuit in communication with the RFID master circuit, a directional coupler coupled to the at least one cable, and an parameter measurement circuit coupled to the directional coupler, wherein the parameter measurement circuit determines the first parameter of the RF device using an output of the directional coupler.

Example 20 includes the method of any of examples 16-19, wherein the RF transceiver system is a remote antenna unit of a distributed antenna system (DAS), wherein the DAS comprises: a master unit configured to receive a base station downlink radio frequency signal and to transmit a base station uplink radio frequency signal; and a plurality of remote antenna units that are each communicatively coupled to the master unit, the plurality of remote antenna units each configured to radiate a remote downlink radio frequency signal from at least one antenna and to receive a remote uplink radio frequency signal from the at least one antenna.

In various alternative embodiments, system and/or device elements, method steps, or example implementations described throughout this disclosure (such as any of the RF transceiver systems, master units, remote antenna units, expansion units, base stations, controllers, transceivers, transponders, RFID master and slave circuits, signal generators, mixers, filters, user equipment, circuitry or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, DAS related terms such as "master unit", "remote unit", "remote antenna unit", "base station", "user equipment", "circuit", "circuitry", "combiner", "coupler", "splitter", "controller", "converter", "circulator", "duplexer", "filter", "hybrid", "signal generator", "mixer", "power supply", "transceiver" and "transponder" refer to hardware elements that would be recognized and understood by those of skill in the art of wireless communications and are not used herein as generic placeholders, nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A radio frequency (RF) communication system, the system comprising:
 a RF transceiver system;
 at least one RF device coupled to the RF transceiver system by at least one cable, wherein the RF transceiver system is configured to transmit an RF signal to the at least one RF device via the at least one cable;
 a remote measurement transceiver in communication with a processor of the RF transceiver system;
 a remote measurement transponder coupled between the at least one cable and the at least one RF device, wherein the remote measurement transponder is directly attached to the at least one RF device;
 wherein the processor controls the remote measurement transceiver to transmit an interrogation signal to the remote measurement transponder;
 wherein the remote measurement transponder, in response to the interrogation signal, determines a first parameter of the at least one RF device based on the RF signal as detected at the at least one RF device, and transmits a response signal to the remote measurement transceiver comprising measurement data that includes the first parameter;
 wherein the remote measurement transceiver outputs the measurement data to the processor of the RF transceiver system.

2. The system of claim 1, wherein to determine the first parameter, the remote measurement transponder measures at least one of:
 a power of the RF signal, a power of a reflection of the RF signal, a temperature, a humidity, a current, or a voltage.

3. The system of claim 1, wherein the processor determines a second parameter at an output of the RF transceiver system and determines a condition of the at least one RF device based on a function of the first parameter and the second parameter.

4. The system of claim 1, further comprising at least one intervening device coupled to the at least one cable between the RF transceiver system and the at least one RF device, the at least one intervening device having a passband, wherein the remote measurement transponder frequency shifts the interrogation signal to a first frequency that is passed by the passband and the remote measurement transceiver frequency shifts the response signal to a second frequency passed by the passband.

5. The system of claim 4, wherein the at least one intervening device compromises one of a splitter, a coupler, a filter or a duplexer.

6. The system of claim 1, wherein the at least one RF device comprises an antenna, wherein the antenna radiates downlink RF signal frequency signal to one or more instances of user equipment (UE) within a coverage area of the RF transceiver system, and wherein the antenna receives uplink RF signal frequency signal from the one or more instances of user equipment (UE) within the coverage area of the RF transceiver system.

7. The system of claim 1, wherein the remote measurement transceiver comprises:
a Radio Frequency Identification (RFID) master circuit in communication with the processor, wherein the processor generates a trigger signal to the RFID master circuit to initiate the interrogation signal.

8. The system of claim 7, wherein the RFID master circuit reads the measurement data from the response signal and outputs the measurement data to the processor.

9. The system of claim 7, wherein the remote measurement transceiver comprises a mixer, wherein the mixer frequency shifts the interrogation signal based on a frequency input from the processor.

10. The system of claim 7, wherein the remote measurement transponder comprises:
a RFID slave circuit in communication with the RFID master circuit;
a directional coupler coupled to the at least one cable;
a parameter measurement circuit coupled to the directional coupler, wherein the parameter measurement circuit determines the first parameter of the at least one RF device using an output of the directional coupler.

11. The system of claim 10, wherein the RFID slave circuit is powered from the interrogation signal transmitted by the RFID master circuit or a modular power supply in the remote measurement transceiver.

12. The system of claim 1, wherein the remote measurement transponder comprises a mixer, wherein the mixer frequency shifts the response signal based on a frequency input from a frequency generator circuit.

13. The system of claim 1, wherein the remote measurement transponder is powered via the at least one cable.

14. The system of claim 1, wherein the remote measurement transceiver is coupled to a plurality of remote measurement transponders via the at least one cable and associates each of the plurality of remote measurement transponders with an identification (ID) code.

15. The system of claim 1, wherein the RF transceiver system is a remote antenna unit of a distributed antenna system (DAS), wherein the DAS comprises:

a master unit configured to receive a base station downlink radio frequency signal and to transmit a base station uplink radio frequency signal; and
a plurality of remote antenna units that are each communicatively coupled to the master unit, the plurality of remote antenna units each configured to radiate a remote downlink radio frequency signal from at least one antenna and to receive a remote uplink radio frequency signal from the at least one antenna.

16. A method for radio frequency (RF) device monitoring for an RF transceiver system, the method comprising:
controlling a remote measurement transceiver utilizing a processor of an RF transceiver system, wherein the RF transceiver system is coupled to at least one RF device by at least one cable that transports RF communications signals between the RF transceiver system and the at least one RF device;
transmitting an interrogation signal to a remote measurement transponder coupled between the at least one cable and the at least one RF device, wherein the remote measurement transponder is directly attached to the at least one RF device;
measuring a first parameter of the at least one RF device based on measurements by the remote measurement transponder of the RF communications signals as received at the at least one RF device;
transmitting a response signal from the remote measurement transponder to the remote measurement transceiver, the response signal including measurement data for the first parameter;
outputting the measurement data from the remote measurement transceiver to the processor and determining a condition of the at least one RF device based on the measurement data for the first parameter.

17. The method of claim 16, further comprising: determining a second parameter at an output of the RF transceiver system, wherein determining the condition of the at least one RF device is based on the first parameter and the second parameter.

18. The method of claim 16, wherein at least one intervening device is coupled to the at least one cable between the RF transceiver system and the at least one RF device, the at least one intervening device having a passband, the method further comprising:
frequency shifting the interrogation signal to a first frequency that is passed by the passband and frequency shifting the response signal to a second frequency passed by the passband.

19. The method of claim 16, wherein the remote measurement transceiver comprises a Radio Frequency Identification (RFID) master circuit in communication with the processor, wherein the processor generates a trigger signal to the RFID master circuit to initiate the interrogation signal; and
wherein the remote measurement transponder comprises a RFID slave circuit in communication with the RFID master circuit, a directional coupler coupled to the at least one cable, and a parameter measurement circuit coupled to the directional coupler, wherein the parameter measurement circuit determines the first parameter of the at least one RF device using an output of the directional coupler.

20. The method of claim 16, wherein the RF transceiver system is a remote antenna unit of a distributed antenna system (DAS), wherein the DAS comprises:

a master unit configured to receive a base station downlink radio frequency signal and to transmit a base station uplink radio frequency signal; and a plurality of remote antenna units that are each communicatively coupled to the master unit, the plurality of remote antenna units each configured to radiate a remote downlink radio frequency signal from at least one antenna and to receive a remote uplink radio frequency signal from the at least one antenna.

\* \* \* \* \*